United States Patent [19]

Rütschle et al.

[11] Patent Number: 4,557,035
[45] Date of Patent: Dec. 10, 1985

[54] MACHINE TOOL WITH TOOL MAGAZINE

[75] Inventors: Eugen Rütschle, Mühlheim; Hans-Henning Winkler; Rudolf Haninger, both of Tuttlingen, all of Fed. Rep. of Germany

[73] Assignee: Chiron-Werke GmbH, Tuttlingen, Fed. Rep. of Germany

[21] Appl. No.: 529,202

[22] Filed: Sep. 2, 1983

[30] Foreign Application Priority Data

Sep. 13, 1982 [DE] Fed. Rep. of Germany ....... 3233934
Jun. 9, 1983 [DE] Fed. Rep. of Germany ....... 3320851

[51] Int. Cl.[4] .......................................... B23Q 3/157
[52] U.S. Cl. .................................... 29/568; 29/26 A; 408/35
[58] Field of Search .................. 29/568, 26 A; 408/35

[56] References Cited

U.S. PATENT DOCUMENTS

| 3,298,098 | 1/1967 | Gleisner, Jr. | 29/568 |
| 3,431,634 | 3/1969 | Balding | 29/568 |
| 3,445,923 | 5/1969 | Balding | 29/568 |
| 3,451,125 | 6/1969 | Lehmkuhl | 29/568 |
| 3,590,470 | 7/1971 | Brainard | 29/568 |
| 3,678,572 | 7/1972 | Mello et al. | 29/568 |
| 4,309,809 | 1/1982 | Yokoe et al. | 29/568 |

FOREIGN PATENT DOCUMENTS

| 1800430 | 7/1969 | Fed. Rep. of Germany | 29/568 |
| 1652673 | 11/1971 | Fed. Rep. of Germany | 29/568 |
| 2163499 | 1/1973 | Fed. Rep. of Germany | . |
| 3017964 | 11/1981 | Fed. Rep. of Germany | . |

Primary Examiner—Z. R. Bilinsky
Attorney, Agent, or Firm—McCormick, Paulding & Huber

[57] ABSTRACT

A machine tool for sequentially machining workpieces with different tools which may be clamped in a spindle of the machine tool, comprising a magazine in which the tools are disposed in a ring pattern and held in holders such that the holder of the tool to be clamped in or unclamped and removed from the spindle is in alignment with the spindle axis during the tool change, is characterized in that the holders of the magazine are distributed about the spindle axis, that each holder is provided with its own drive which moves it into a position where it is aligned with the spindle axis (clamping position) and into a position outside the spindle axis (magazine position) and that the holder remains aligned with the spindle axis while the tool held therein performs a machining operation. This permits a very quick tool change.

14 Claims, 12 Drawing Figures

MACHINE TOOL WITH TOOL MAGAZINE

This invention relates to a machine tool for sequentially machining workpieces with different tools which may be clamped in a spindle of the machine tool, comprising a magazine in which the tools are disposed in a ring pattern and held in holders such that the holder of the tool to be clamped in or unclamped and removed from the spindle is in alignment with the spindle axis during the tool change.

Such machines are known per se. One such machine is described as prior art in Disclosed German Patent Application No. 30 17 964, for example. In one such known machine, the magazine takes the form of a rotatably supported plate provided with recesses ending at the periphery of the plate into which the tools are radially inserted. A mechanical drive first moves the spindle into a predetermined position, whereupon the magazine plate is approached to the spindle so that the edges of the tool holding recess in the plate engage the tool held in the spindle which is then unclamped to release it from the spindle, whereupon the spindle is moved away and the magazine plate turned to the standby position of the tool to be used next. The spindle then returns, and the tool held in the next recess of the magazine plate is clamped in the spindle. The tool change is completed by returning the magazine plate to its initial position.

With this known machine and similar other machines, the tool change is performed comparatively quickly if the tool required for the next operation is located in the magazine position following directly after the magazine position of the tool just in use. If, however, the tool required for the next operation is located at a major distance from the holder for the tool in use, then the magazine must perform a major rotary movement which takes correspondingly more time. As a result, waiting times are unavoidable when changing tools on the known machines, especially if tools are frequently used for operations taking only a very short time, such as countersinking. This also applies to machines on which a feeder equipped with two holding devices is disposed between the magazine and the spindle so that while one tool is performing a machining operation the tool required for the next operation can be removed from the magazine which has meanwhile been turned to an appropriate position, thus permitting this second tool to be clamped in the spindle as soon as the first tool has been unclamped by turning the feeder through 180° about a generally vertical axis.

Now, it is the object of the present invention to design a machine tool of the type described herein first above in such a manner that the times required for access to the individual tools are reduced. According to the invention, this is achieved by distributing the various holders of the magazine about the spindle axis, by providing each holder with its own drive moving the holder into a position where it is in alignment with the spindle axis (clamping position) and into a position outside the spindle axis (magazine position) and by keeping the holder aligned with the spindle axis and in engagement with the tool while the tool performs a machining operation.

It is one advantage of this machine that, because each tool holder is provided with its own drive, each tool can be moved into the clamping position by means of this drive when the clamping position is free without the need of first turning the magazine by one or more steps until a desired tool is in an appropriate position for transfer to the clamping position. In the machine of this invention, each tool is in a position from which it can be transferred to the clamping position by the shortest possible route by means of its own drive. Accordingly, the time required for a tool change is always substantially the same regardless of which tool is the next to be used. If, according to a preferred embodiment of the invention, all holders have the same design so that, in the magazine position, the tools are located on the periphery of a circle about the spindle axis, the tool change or access times are exactly the same. Since the holder remains in engagement with the corresponding tool, the holders may be of simple design.

A further advantage of the machine in accordance with this invention is that the advantages of the machine tools described herein first above are maintained, namely the accurate location of the individual tools in the spindle so that all tools have the same axial direction when they are positioned in the spindle. This enables the machine to perform highly accurate work. Nevertheless, the performance of the devices moving the tools from the magazine position to the clamping position need not be highly accurate, but only accurate enough to hold the tool, prior to clamping, in a position in which it can be dependably engaged and clamped by the clamping mechanism of the spindle.

The statement that during operation of the machine tool the holder of the tool just in use is in alignment with the spindle axis does not necessarily require the holder to maintain always the same position relative to the spindle as viewed in the longitudinal direction of the spindle axis during operation of the machine tool when the spindle generally performs working movements in its longitudinal direction (hereinafter referred to as vertical direction). The holder will, however, perform any longitudinal and transverse movements in a horizontal plane together with the spindle, just like the holders in the magazine position which maintain their circular position about the spindle. According to one embodiment of the invention, the holders are retained in a common carrier which is connected to the spindle head of the machine guiding the spindle in such a manner that it follows the vertical movements of the spindle head. One advantage of this embodiment is that the individual tools may be captively held in their holders, that is to say very safely since the relative position of tools and holder hardly changes even during operation of the machine. The only change that may occur is due to the fact that during the clamping operation most clamping devices draw the tool, which generally is provided with a taper shank for insertion into the spindle, into a corresponding taper hole in the spindle thereby moving it a few millimeters, one to three millimeters for example, in order to bring it into an accurately defined position. The holder need therefore only be designed so as to permit this comparatively slight lift of the tool. The fact that the tools are captively held in their holders does not prevent the holder from being easily opened, with or without a tool, in order to exchange one of the tools contained in the magazine for another one.

The mechanism for causing a relative movement parallel to the spindle axis in order to effect a tool change is necessary to permit a relative movement between the tool and the spindle in the vertical direction which must take place after the tool has been unclamped in order to move the taper shank of the tool out of the taper hole in the spindle. In principle, any desired drive means may be provided to achieve this relative movement.

However, according to one embodiment of the invention, the carrier is held in contact with a stop of the spindle head with the aid of elastic tensioning means as long as the spindle is in a position where it has been moved out of the tool changing position toward the workpiece in the direction of the spindle asix. When the spindle reaches the tool changing position, a part of the carrier comes to rest against a stop located at a constant height, such that the carrier remains stationary when the spindle is retracted to release the tool which has been unclamped in the mean time. This embodiment of the invention permits the various movements, which are rather complicated per se, to be performed in a very simple manner.

One embodiment of the invention provides a particularly simple design of the abovementioned tensioning means in the form of at least one helical tension spring, two such helical tension springs being used in the embodiment shown by way of example. Such tensioning means are simple and quick to manufacture, their effectiveness can easily be checked by visual inspection at all times, and they are very durable if appropriately dimensioned. Such tensioning means have the added advantage that their effectiveness is not dependent on the availability of any source of external energy. This design permits the tubular section forming part of the carrier to be suspended from the spindle head by the abovementioned tensioning means or the helical tension springs of the present embodiment. There is then no need for any further fastening arrangements. If flexible lines are used to supply the individual drive units of the holders with energy (hose lines for pressure fluids or electric cables), it is actually unnecessary that the radial position of the individual holders of the magazine relative to the spindle axis is always constant in order to assure a dependable performance of the tool change. For practical reasons, however, such as the need of taking into account the path followed by the point of the tool during a tool change in planning a proposed application of the machine, the carrier is prevented from turning relative to the spindle head when the machine is ready for operation. This may be achieved by any appropriate design.

According to one embodiment of the invention, the holders are connected to the carrier by means of links. Such links are a particularly simple and dependable means of fixing the path to be followed by the individual holders. Preferably, the tools are guided in such a way that the longitudinal axis of the tool remains parallel to itself while the tool is moved into and out of the clamping position. To achieve this, a further embodiment of the invention provides for the use of a parallelogram of links wherein two adjacent ends of two parallel links of equal length are secured to the ring of the holder in such a manner that they can be swiveled about spaced horizontal axes while the other two ends of the same links are swivably secured to the holder.

According to still another embodiment of the invention, a further drive is provided which permits the carrier to be moved even if the spindle head is stationary.

This embodiment thus has the advantage that in order to release the tool and provide the relative movement between the carrier and the spindle head required for that purpose the spindle head itself need no longer be moved since the further drive provided according to this embodiment permits the carrier to be moved relative to the spindle head at any position of the latter. This increases the flexibility of the machine tool on the one hand and, on the other hand, reduces the time required for a tool change inasmuch as tools can then also be changed directly above the workpiece without moving the spindle head into its uppermost position.

According to a preferred embodiment of the invention, elastic tensioning means keep the carrier in contact with a stop of the spindle head, when the said further drive is not in operation, as long as the carrier is not in a tool changing position, whereas the said further drive moves the carrier along the spindle axis, overcoming the force exerted by the tensioning means, in order to bring it into the tool changing position for release of the tool.

This arrangement has the advantage that the design of the said further drive may be simple because it is only required to move the carrier in one direction, overcoming the force exerted by the elastic tensioning means, such as a helical spring. The carrier is returned by the action of the tensioning means alone. The said further drive is not required for that purpose. Moreover, the elastic tensioning means keeps the carrier in position during the machining operations.

If, according to a further embodiment of the invention, the said further drive is provided with a pressure fluid cylinder disposed in a fixed position on the spindle head and if the piston rod of that cylinder directly or indirectly engages the carrier, then the carrier may be moved into the tool changing position by simple control. This control is particularly simple if, as described herein further above, advantage can be taken of the return force of an elastic tensioning means since in that case the pressure fluid need be applied to one side of the piston only.

Finally, an embodiment is preferred wherein the holders are connected to the carrier by means of links, wherein the carrier furthermore is provided with upwardly projecting sections and wherein the piston rod engages one of these sections.

This embodiment has the advantage that the said further drive may be disposed in the upper region of the spindle head so as not to interfere with the space in the region of the spindle which is virtually completely needed for performing the tool change.

The holders are preferably moved by means of piston and cylinder units which preferably operate on compressed air, considering that they are not required to apply high forces. These piston and cylinder units preferably engage the carrier with one end and a part pertaining to the mechanism formed by the links with the other end.

Further features and advantages of the invention will become apparent from the following description of specific embodiments of the invention when read in conjunction with the accompanying drawing showing details which are essential to this invention and from the appended claims. The various features may be employed individually or in any desired combination of a plurality of such features in one embodiment of the invention. In the accompanying drawing

Figure 1:
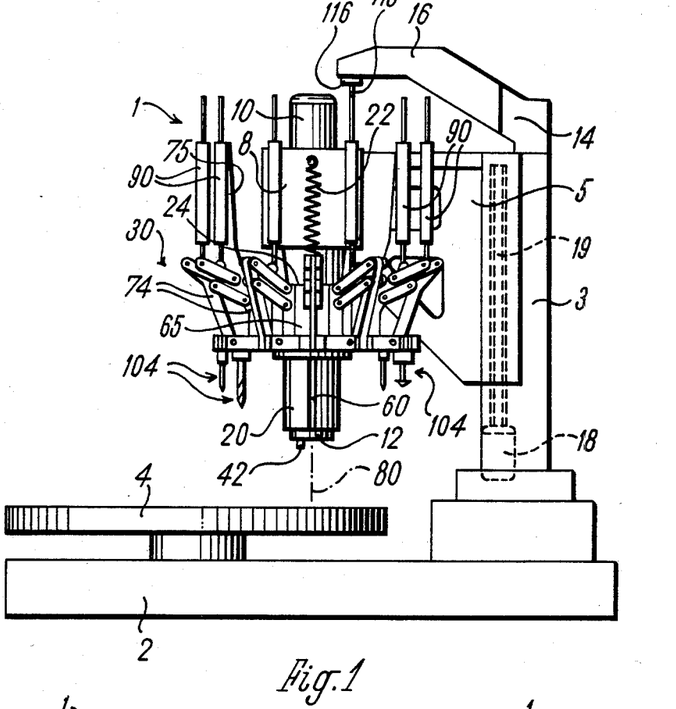
FIG. 1 is a greatly simplified side elevation of the complete machine according to a first embodiment of the invention shown by way of example.

FIG. 1 shows a diagrammatic representation of a machine tool 1 with a base 2 on which a column 3 is guided for displacement in a horizontal plane in two coordinate directions extending at right angles to each other in a manner not illustrated in detail. It should, however, be understood that the invention is also applicable to machines on which a compound table mounting the workpiece to be machined may be displaced along two coordinates in a horizontal plane instead of displacing the column as described above.

A rotary indexing table or rotary table 4 disposed on the base 2 so that it can be turned about a vertical axis and locked in two positions spaced 180° apart permits two workpieces to be mounted in such a manner that while one workpiece is being machined the other, already finished workpiece can be unloaded and a new workpiece which is still to be machined loaded in its place.

A carrier 5 carrying a spindle head 8 at its free end is supported on the column 3 in a manner permitting it to be displaced in the vertical direction. At its upper end, the spindle head 8 is provided with a motor 10 driving the spindle 12 which can be rotated about a vertical axis inside the spindle head 8. The spindle 12 is supported in the spindle head 8 in a manner preventing it from being displaced. A cantilever 14 is disposed at the upper end of the column 3. In the region of its free end, this cantilever has two arms 16 whose ends, in a top view, are disposed on both sides of the spindle head where they serve to provide stops for a purpose still to be explained.

In the region adjacent to its lower end, the spindle head 8 has a tubular section 20 which may be locked to prevent relative rotation and on which the magazine 30 only hinted at in FIG. 1 is guided for displacement parallel to the spindle axis and held in contact with a shoulder 24 of the spindle head 8 projecting laterally beyond the tubular section 20 by means of helical tension springs 22 during all operations of the machine.

The carrier 5 together with the spindle head 8 can be displaced by means of a screw spindle 19 driven by a motor 18 disposed in the column 3. This motor 18 provides the vertical movements of the spindle 12 and the tool clamped therein at the time.

Figure 2:
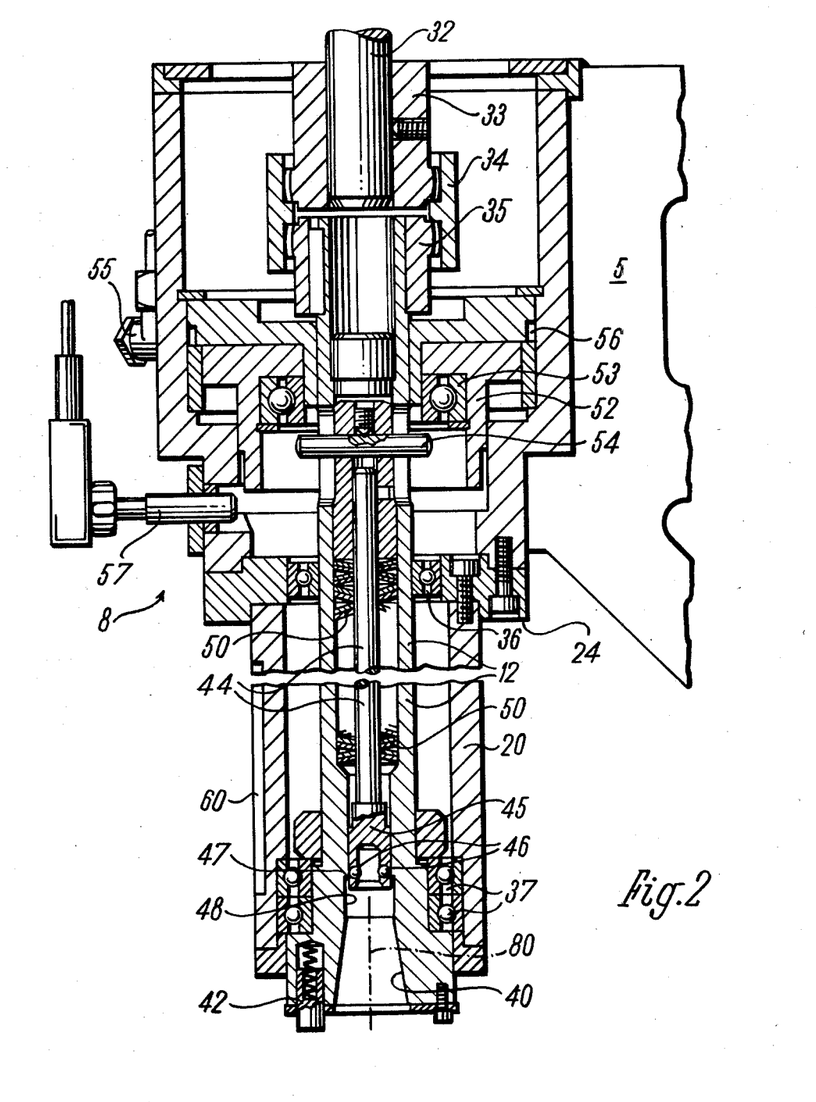
FIG. 2 is a longitudinal section, partially fragmentary, through a side elevation of the spindle head drawn to a substantially larger scale than FIG. 1, omitting the tool magazine.

In FIG. 2, the motor 10 has been omitted in order to simplify the drawing. This motor 10 drives a shaft 32 which rotates the spindle 12 via a coupling 33, 34, 35. This spindle 12 is supported in ball bearings 36 and 37 near its upper and lower ends. The spindle 12 is substantially tubular in shape and has a flared tool hole taking the form of a truncated cone 40 at its lower end. A spring-loaded pin 42 provided at the lower face of the spindle 12 engages a recess in the tool and thus prevents relative rotation between the spindle and the tool when a tool is clamped while the spindle is still rotating at low speed. Inside the spindle 12 there is a clamping rod 44 with a clamping means 45 at its lower end in which the balls 46 are held captive. When the clamping rod 44 is moved downward a short distance in relation to the position shown in FIG. 2, the balls 46 pass a shoulder 47 in a cylindrical hole 48 adjacent to the tool hole 40 whereby the balls are enabled to move radially outward so that a tool retained by the balls in the clamping means 45 is released and another tool can be inserted in its place. An assembly of cup springs 50 pushes the clamping rod 44 upward at all times except during the tool change so that the tool is safely clamped without any need for an external source of energy. The downward movement of the clamping rod 44 is caused by compressed air. For this purpose, an air piston 52 is provided which pushes against a cross pin 54 in the spindle 12 via a ball bearing 53 when compressed air is admitted to the top of the air piston 52 through a port 55 which communicates with a annular duct 56. A magnetic switch 57 senses the lowermost position of the air piston 52 in order to enable the tool released by the clamping means 45 to be removed and a new tool to be moved into position in response to the signal provided by the magnetic switch 57. The spindle head shown in FIG. 2 largely conforms to the state of the art. For this reason, only those parts which are absolutely necessary for a proper understanding of the invention have been explained while all parts not absolutely necessary for such understanding have bben omitted in the drawing.

The tubular section 20 is cylindrical on the outside. At one point, it is provided with a groove 60 extending parallel to the longitudinal axis of the tubular section 20. This groove serves to prevent relative rotation of the magazine 30 which is guided for displacement on the outside of the tubular section 20.

Figure 3:
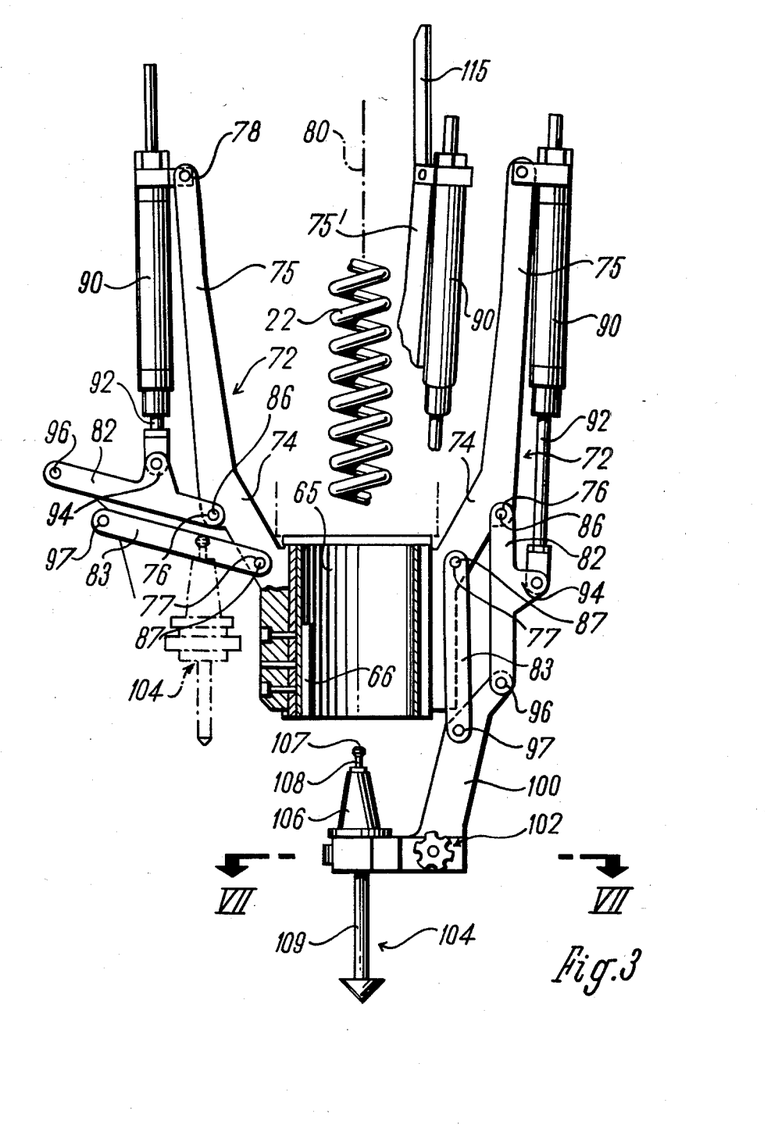
FIG. 3 is a side elevation of the magazine, partially shown as a longitudinal section, drawn to a smaller scale than FIG. 2.
Figure 4:
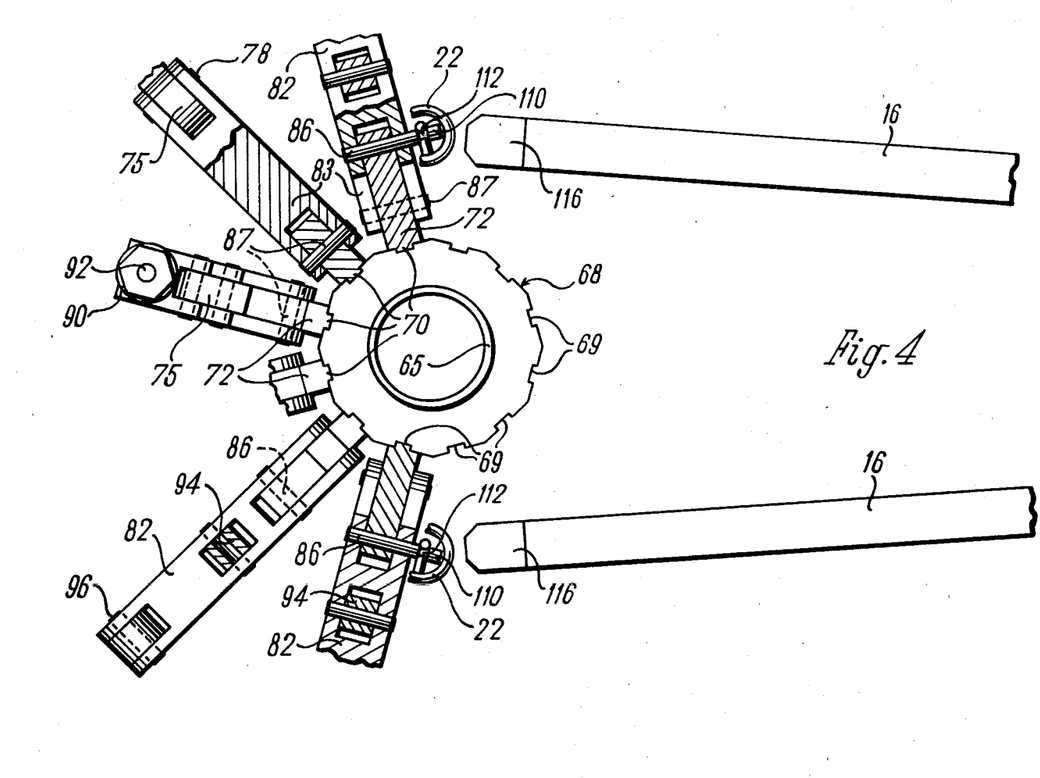
FIG. 4 is a top plan view of the magazine according to FIG. 3, partially shown as a cross-section in different horizontal planes.

The magazine 30 shown in detail in FIGS. 3 and 4 has a tubular section 65 which is cylindrical inside and whose inside diameter is equal to the outside diameter of the tubular section 20 except for the play required to permit displacement. A projecting strip 66 bolted to the inside of the tubular section 65 engages the groove 60, thereby preventing relative rotation between the tubular section 65 and the tubular section 20. The outside of the tubular section 65 is designed in the form of a polygon in order to provide flat contact surfaces for attaching the individual tool holding devices. For accurate location of the individual tool holding devices, the polygonal outer surface 68 of the tubular section 65 is, moreover, provided with longitudinal grooves 69 which are each engaged by a projecting strip 70 of a holder component 72 forming part of the holding device for a tool. The total number of holder components provided on the tubular section 65 is twelve. This means that a maximum of twelve tools can be accommodated in the magazine 30 shown in the accompanying drawing.

The holder component 72 includes a section 74 starting just below the top edge of the tubular section 65 extending radially upward and slightly outward at an angle of about 30° with the vertical and continuing in a further section 75 which also extends radially upward and outward, but more steeply at an angle of about 4° with the vertical. The section 74 is provided with two pivot pin holes 76 and 77 disposed in spaced relation to each other and extending transversely to the longitudinal central plane of the holder component 72 while this longitudinal central plane extends radially to the spindle axis 80. A further pivot pin hole 78 is provided near the upper end of the section 75. Two links 82 and 83 having equal length and extending parallel to each other are swivably supported in the pivot pin holes 76 and 77 by means of pivot pins 86 and 87 at the ends facing the spindle axis 80, which means that they can be swiveled about a horizontal axis. In the pivot pin hole 78, the upper end of a cylinder forming part of a pneumatic piston and cylinder unit 90 can be swiveled about an axis extending parallel to the pivot pin holes 76 and 77, and the lower end of the piston rod 92 of the piston and cylinder unit 90 is swivably connected to an upward projection 94 on the link 82. The pivot pin holes 96 and 97 disposed in the region of the ends of the links 82 and 83 facing away from the spindle axis 80 are connected to an arm 100 extending downward and radially inward toward the spindle axis 80. In this arrangement, an imaginary line connecting the pivot pin hole 96 with the pivot pin hole 97 extends parallel to an imaginary line connecting the pivot pin hole 86 with the pivot pin hole 87 and the distance between the holes 96 and 97 is equal to that between the holes 86 and 87. This arrangement assures parallel motion. The arm 100 carries a holder 102 for a tool at its lower end. This tool 104 shown in FIG. 3 includes a truncated cone 106 which fits into the tool hole 40 and at the upper end of which a clamping bolt 107 is disposed which has a necked-down portion 108 at some distance from its upper end. This necked-down portion is engaged by the balls 46 of the clamping means 45 during the clamping operation. The tool which in FIG. 3 is located on the spindle axis 80 is assumed to be a countersink 109 as indicated in the drawing.

On ten of the twelve holding devices the pivot pins 86 have the same length as the pivot pins 87, thus projecting only slightly beyond the vertical sides of the links 82 and 83 whose bifurcated ends extend around the holder components 72. However, two of the pivot pins 86 are provided with an extension 110 on one side. These extensions 110 are disposed approximately diametrically opposite each other and provided with an annular groove 112 for engaging the lower end of the helical tension springs 22 mentioned herein above. The upper end of these helical tension springs 22 is secured to the spindle head 8 near its upper end as shown in FIG. 1. When the magazine shown in FIGS. 3 and 4 is attached to the spindle head 8, the tubular section 65 is first pushed over the tubular section 20 from below, whereupon the lower ends of the helical tension springs, whose upper ends may already have been secured to the spindle head, are hooked into the annular grooves 112. The helical tension springs 22 keep the tubular section 65 in contact with the shoulder 24 (FIG. 2) at all times during operation of the machine.

Two of the sections holding the upper ends of the piston and cylinder units 90 are denoted with the numeral 75' because unlike the other sections 75 these two sections are provided with upward extensions 115. The upper ends of the extensions 115 are located directly below the free ends 118 of the arms 16. As soon as the upward movement of the spindle head followed by the magazine 30 has reached a point where the spindle head has been raised high enough for the supper ends of the extensions 115 to butt against the free ends 118 of the arms 16 from below, the magazine 30 is prevented from following the further upward movement of the spindle head 8. The magazine then stays at the height determined by the free ends 118 acting as stops while the helical tension springs 22 are increasingly tensioned as the spindle head 8 continues its upward movement. This upward movement performed by the spindle head 8 while the magazine 30 is stationary is necessary in order to move the lower end of the spindle 12 out of the region of the cone 106 of the tool so that the tool can be changed.

Figure 5:
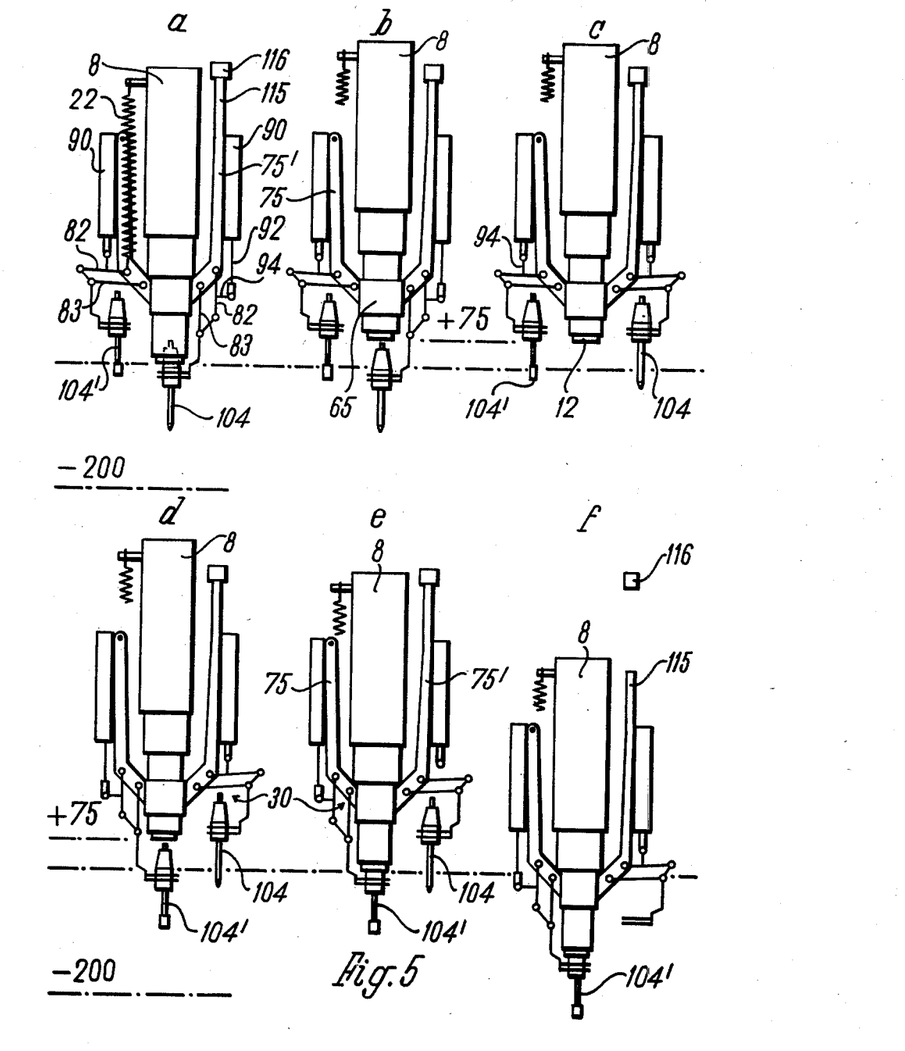
FIG. 5 is a schematic representation of the sequence of operations involved in a tool change.

FIG. 5 a through f is a schematic representation of a complete tool changing sequence. The vertical movement of the spindle head 8 is denoted as movement in the Z-axis or Z-coordinate, and the height $Z=0$ is that height of the lower end of the spindle 12 at which the clamping means 45 inside is operated to unclamp or clamp the tool. The region from height $Z=0$ downward to $Z=-200$ (mm) is the range in millimeters within which work can be performed by the spindle. FIG. 5a shows a position in which the spindle is at $Z=0$ and a tool 104 held by the holder component 72 on the right is in alignment with the spindle. In this position, the upper end of the extension 115 has come to rest at the free end 116 of the arm 16. In this position, the tool 104 is unclamped by admitting compressed air to the air piston 52, but stays substantially in the position shown in FIG. 5a. Next, the spindle head 8 is moved further up while the magazine 30 stays in its vertical position until the spindle head 8 reaches the position shown in FIG. 5b. In this position, the tool 104 is completely free from the spindle. Then, the tool 104 used last is swiveled into its magazine position by operating the piston and cylinder unit 90 depicted on the right in FIG. 5 as shown in FIG. 5c. Now the piston and cylinder unit on the left, which may, of course, also be any other piston and cylinder unit, is operated to move the tool on the left in FIG. 5, which is denoted with the numeral 104', from its magazine position into the position where it is in alignment with the spindle as shown in FIG. 5d. The spindle head 8 then moves down again, returning to height $Z=0$, and the clamping means clamping the tool 104' is operated by the cup springs 50 after release of the air piston 52. This condition is shown in FIG. 5e. FIG. 5f, finally, shows the spindle head complete with magazine in a position slightly lower than $Z=0$ in which the machine can perform any desired operations.

As can be clearly seen in both FIG. 5 and FIG. 2, the links 82 and 83 for the tool in working position extend parallel to the spindle axis, whereas in the magazine position the links are swiveled upward by slightly more than 90° in relation to the working position.

Figure 6:
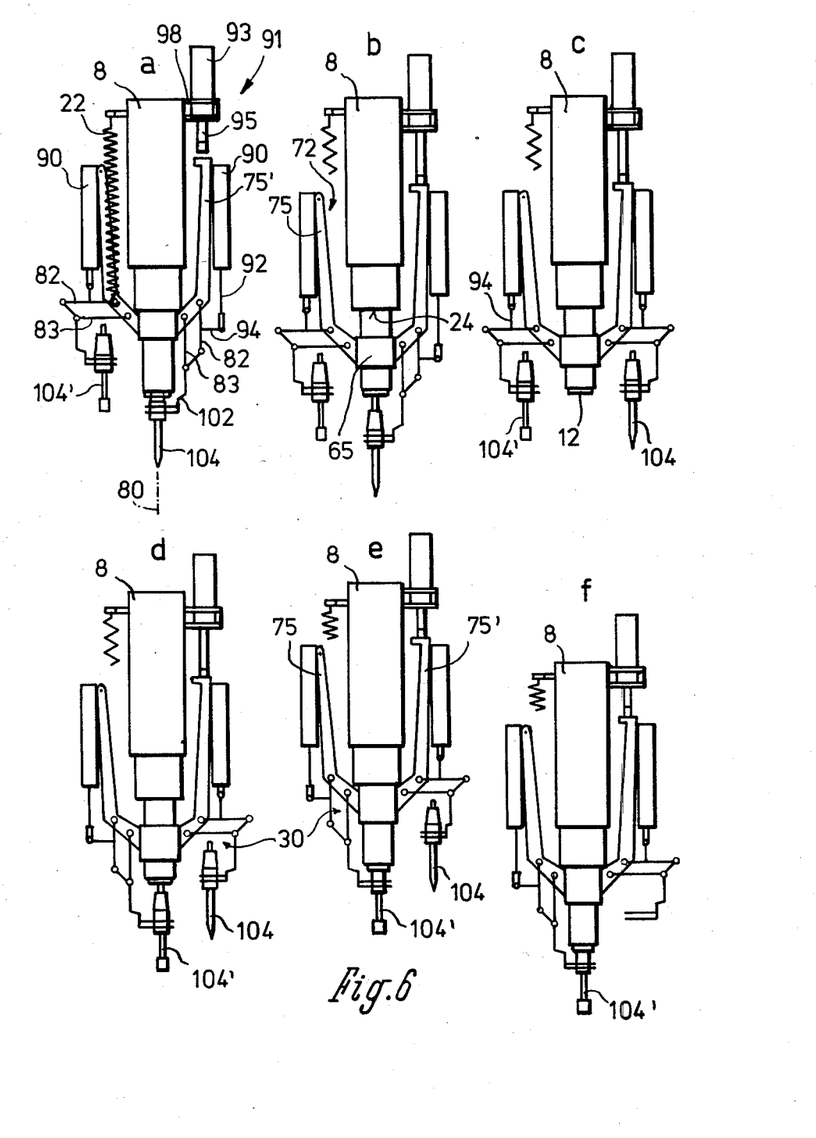
FIG. 6 is a schematic representation of the sequence of operations involved in a tool change on a machine according to a second embodiment of the invention shown by way of example.
Figure 7:
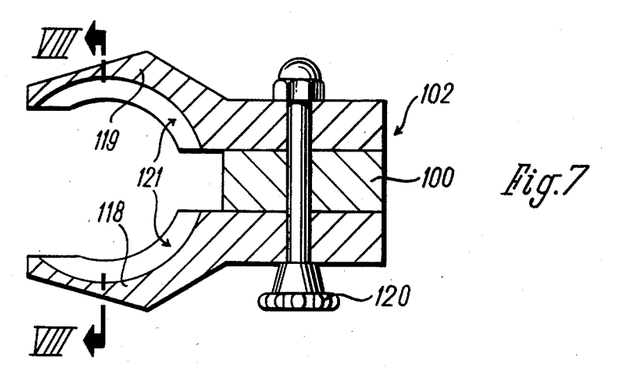
FIG. 7 is a section along the line VII—VII in FIG. 3.

The machine tool shown in FIG. 6 has a spindle head 8 which, at its lower end, continues into a spindle 12 carrying a tool 104. The spindle axis is denoted with the numeral 80. The tool 104 is held by a holder 102 (schematic representation) which, in turn, is held by a parallelogram linkage comprising the links 82 and 83. The link 82 is engaged by a projection 94 of a piston rod 92 forming part of a first drive unit 90. Like the links 82 and 83, this drive unit 90 is disposed on a section 75 or 75'. All sections 75, 75' pertaining to the various tools 104, 104' are secured to a common carrier which takes the form of a tubular section 65 in the embodiment of the invention shown by way of example. The tubular section 65 surrounds the spindle 12 and can be displaced on this spindle. In the working position, the tubular section 65 is pressed against a stop 24 of the spindle head 8 by a helical tension spring 22.

The tools 104, 104' are extended and retracted by the first drive unit 90 via the elements 92, 94, 82, 83, 102 as described herein above.

A pressure fluid cylinder 93 secured to the upper end of the spindle head 8 by means of a retainer 98 cooperates with a piston rod 95 to form a further drive unit 91. The free end of the piston rod 95 contacts the upper end of the section 75'.

In phase (a) of FIG. 6, the tool 104 is unclamped in the spindle 12, and the piston rod 95 rests loosely on the section 75'. In phase (b), the further drive unit 91 is activated, and the piston rod 95 presses against the section 75', thereby pushing the tubular section 65 down so that the holder 102 together with the tool 104 is moved down and the tool 104 leaves the spindle 12.

In phase (c), the drive unit 90 is activated, causing the links 82, 83 to be swiveled to the right in FIG. 6 and the tool 104 to be moved out of the region of the spindle axis 80.

In phase (d), the drive unit 90 shown on the left in FIG. 6 performs a movement opposite to that performed in phase (c) so that a further tool 104' is moved in alignment with the spindle axis 80.

In phase (e), the further drive unit 91 is switched off so that the helical tension spring 22 pulls the tubular section 65 up again until it comes to rest against the stop 24. At the same time, the tool 104' is thus introduced into the spindle and then clamped. The necessary torque is transmitted by means of drivers on the spindle engaging corresponding grooves in the tool shank. The machine tool is now ready for the next operation.

Phase (f) shows the working position of the machine tool in which the spindle head 8 with the firmly clamped tool 104' is moved into its lower working position for machining a workpiece (not shown).

Referring to FIG. 6, it is clearly apparent that in order to change the tools 104, 104', the spindlehead 8 need only be moved up and away from the surface of the workpiece by a distance corresponding to the working travel of the piston rod 95. It is therefore not necessary to move the spindle head 8 into its uppermost position.

Figure 8:
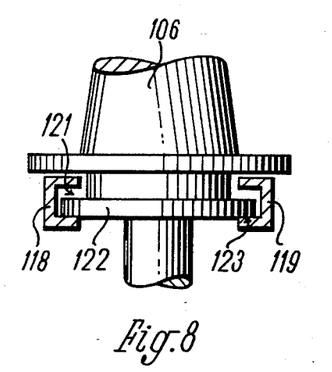
FIG. 8 is a longitudinal section along the line VIII—VIII in FIG. 7 through a holder holding a tool not clamped in the spindle in the position shown.
Figure 9:
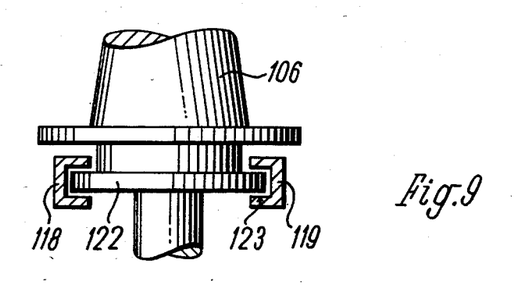
FIG. 9 is a longitudinal section similar to that shown in FIG. 8, but with a tool clamped in the spindle.

The holder 102 includes two dished parts 118 and 119 which are secured to the arm 100. The part 118 can be removed after loosening a clamping bolt 120, thus permitting a tool to be removed from or inserted into the holder 102. The parts 118, 119 have a C-shaped cross-section. A groove 121 on the inside of the parts 118, 119 is designed to receive a flange 122 disposed below the truncated cone 106. The flange 122 has a small amount of lateral play within the groove 121. As long as a tool is not clamped in the spindle of the machine tool, the flange 122 seats on the lower retaining surface 123 of the groove 122. The height of the groove 121 is such that the flange 122 will not come into contact with the upper retaining surface of the groove 121 when the tool is lifted by a few millimeters upon being introduced into and clamped in the spindle as shown in FIG. 9. Consequently, the tool, when clamped in the spindle, is not in contact with its holder, but nevertheless captively connected thereto because the groove 121 also extends over the top of the flange 122 in a wrap-around configuration. The holder has no parts which must be moved to release the tool when it is clamped in the spindle. This means that this design, too, is covered by the statement in claim 1 that "the holder remains in engagement with the tool while the tool held therein performs a machining operation".

Figure 10:
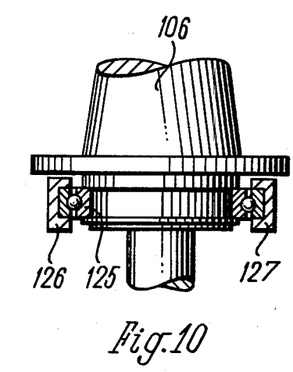
FIG. 10 is a longitudinal section similar to that shown in FIG. 8 through a holder according to another embodiment of the invention.

In the other embodiment of the invention shown in FIG. 10, the tool has no flange 122 prevented from moving relative to the truncated cone 106, but a ball bearing 125 forming a flange-type projection instead of the said flange 122. The height of the groove provided in the dished parts here denoted with the numerals 126 and 127 and their diameter are such that the ball bearing 125 is received without play. When the tool is clamped after introduction into the spindle, the complete holder slightly yields resiliently so that the tool can be properly clamped.

Figure 11:
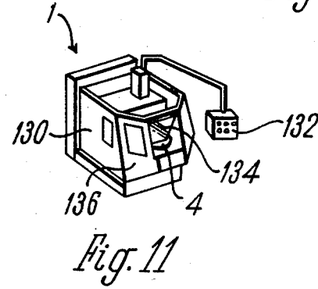
FIG. 11 is a simplified perspective view of the machine with protective enclosure and open access door.
Figure 12:
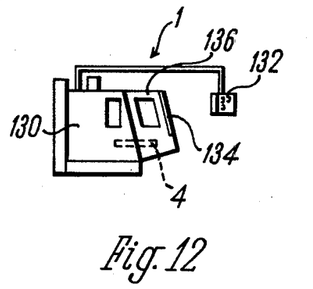
FIG. 12 is a side view showing the access door in the closed position.

As shown in FIGS. 11 and 12, the complete machine is surrounded by a protective enclosure 130 provided with break-proof windows through which the operator can observe the operation of the machine. A control panel 132 permits direct intervention into the operation of the machine. In addition, a digital control system permits fully automated work cycles requiring no intervention on the part of the operator. For changing the workpieces, the front of the enclosure 130 is provided with a door 134 which can be swiveled about a horizontal axis near its top edge. In the open position shown in FIG. 11, the door 134 has been pushed into the interior of the enclosure so that the operator can unload a finished workpiece from the rotary table 4 and load the rotary table 4 with another workpiece still to be machined. The configuration is such that the bottom edge of the door 134, cooperating with a wall-type upward projection in the center of the rotary table 4, dependably prevents any coolant or swarf to be flung out during machining of the workpiece located behind the door as viewed by the operator. After changing the workpiece, the operator moves the door 134 back into its forward position until its two longitudinal edges are in alignment with the front side panels 136 and 138 of the enclosure. No swarf or coolant can penetrate to the outside in this position either. Furthermore, an interlock is provided which permits the door 134 to be moved only when the rotary table 4 is stationary and which, on the other hand, prevents any rotation of the rotary table 4 as long as the door 134 is in its open position inside the enclosure. The complete machine as shown in FIG. 1 has a weight of approximately 2500 kg. The outside diameter of the tubular section 20 is 100 mm. The length of the tubular section 20 is approximately 220 mm. The outside diameter of the tubular section 65 as shown in FIG. 3 is approximately 125 mm, its length approximately 140 mm. For further dimensions reference should be made to the FIGS. 3 and 4 which are drawn true to scale.

We claim:

1. Machine tool for sequentially machining the pieces with different tools which may be clamped in a spindle of the machine tool, with a magazine in which the tools are disposed in a ring pattern around the spindle axis and held in holders, each holder being provided with its own drive which moves it in a position where it is aligned with a spindle axis (clamping position) and into a position outside the spindle axis (magazine position), the said holders being retained in a common carrier which is connected to the spindle head of the machine guiding the spindle in such a manner that the carrier is shiftable parallel to the spindle axis and is in a fixed position relatively to the spindle head during the cutting operation of the machine tool and is moved parallel to the spindle axis relatively to the spindle head during the tool change, wherein the holder remains in alignment with the spindle axis during the cutting operation of the tool associated with that holder, the carrier has only two shift positions relative to the spindle head, namely one shift position, in which the tool is inserted into the spindle and the machine tool works, and the other shift position, in which the tool held by the holder in alignment with the spindle axis is completely free, and the drive for each holder comprises a parallel guide comprising two links.

2. Machine tool according to claim 1, wherein the links (82, 83) related to a tool being in working position are arranged in parallel to the spindle axis, and in the magazine position the links are swiveled upward by more than 90° in relation to the working position.

3. Machine tool according to claim 1 wherein the holder engages the associated tool during the cutting operation.

4. A machine tool as claimed in claim 2, characterized in that the said carrier is provided with a tubular section guided for displacement in the direction of the spindle axis on a corresponding tubular section of the spindle head, that means are provided for keeping said tubular section of the said carrier in a fixed position relative to said tubular section of the said spindle head during the working movements of said spindle head and that means are provided for effecting a relative movement parallel to the spindle axis between said tubular section of the said carrier and said tubular section of the said spindle head during the tool change.

5. A machine tool as claimed in claim 4, characterized in that the said carrier is held in contact with a stop of the spindle head with the aid of elastic tensioning means as long as the spindle is in a position where it has been moved out of the tool changing position toward the workpiece in the direction of the spindle axis and that when the spindle reaches the tool changing position, a part of said carrier comes to rest against a stop located at a fixed height, such that the said carrier remains stationary when the spindle is retracted to release the tool.

6. A machine tool as claimed in claim 4, characterized in that said elastic tensioning means include at least one helical tension spring.

7. A machine tool according to claim 1, wherein a further drive is provided which permits the said carrier to be moved even if the said spindle head is stationary.

8. A machine tool as claimed in claim 7, characterized in that the said further drive is provided with a pressure fluid cylinder disposed in a fixed position on the spindle head and that the piston rod of said pressure fluid cylinder directly or indirectly engages the said carrier.

9. A machine tool as claimed in claim 7, characterized in that elastic tensioning means keep the said carrier in contact with a stop of the spindle head when the said further drive is not in operation as long as the said carrier is not in a tool changing position and that the said further drive moves the said carrier along the spindle axis, overcoming the force exerted by the said tensioning means, in order to bring it into the tool changing position.

10. A machine tool according to claim 1 wherein the carrier is provided with at least one upwardly projecting section and the piston rod engages said section.

11. A machine tool according to claim 10, wherein a parallelogram of links is provided wherein the two adjacent ends of the two parallel links which are of equal length, are secured to the tubular section of the carrier in such a manner that they can be swivelled about spaced horizontally axes and that the other two ends of the said links are swivably secured to the holder.

12. A machine tool as claimed in claim 1, characterized in that a piston and cylinder unit is provided to moved the holders into and out of the tool changing position.

13. A machine tool as claimed in claim 12, characterized in that the said piston and cylinder unit engages the carrier with one end and a part pertaining to the mechanism formed by the links with the other end.

14. Machine tool for sequentially machining the pieces with different tools which may be clamped in a spindle of the machine tool, with a magazine in which the tools are disposed in a ring pattern around the spindle axis and held in holders, each holder being provided with its own drive which moves it in a position where it is aligned with a spindle axis (clamping position) and into a position outside the spindle axis (magazine position), the said holders being retained in a common carrier which is connected to the spindle head of the machine guiding the spindle in such a manner that the carrier is shiftable parallel to the spindle axis and is in a fixed position relatively to the spindle head during the cutting operation of the machine tool and is moved parallel to the spindle axis relatively to the spindle head during the tool change, wherein the holder remains in alignment with the spindle axis during the cutting operation of the tool associated with that holder, the carrier has only two shift postions relative to the spindle head, namely one shift position, in which the tool is inserted into the spindle and the machine tool works, and the other shift position, in which the tool held by the holder in alignment with the spindle axis is completely free, and the drive for each holder comprises a parallel guide comprising two links, said links with a tool in working position being arranged in parallel with the spindle axis, and in the magazine position the links being swivelled upward by more than 90 in relation to the working position, said carrier being provided with a tubular section guided for displacement in the direction of the spindle axis on a corresponding tubular section of the spindle head, means being provided for keeping said tubular section of said carrier in a fixed position relative to said tubular section of the said spindle head during the working movements of said spindle head, and means also being provided for effecting relative movement parallel to the spindle axis between said tubular section of the said carrier and said tubular section of the said spindle head during tool change, and said carrier being held in contact with a stop of the spindle head with the aid of elastic tensioning means as long as the spindle is in a position where it has been moved out of the tool changing position toward the workpiece in the direction of the spindle axis, and when the spindle reaches the tool changing position, a part of said carrier coming to rest against a stop located at a fixed height, such that the said carrier remains stationary when the spindle is retracted to release the tool.

* * * * *